(12) United States Patent
Snider et al.

(10) Patent No.: US 10,843,644 B2
(45) Date of Patent: Nov. 24, 2020

(54) VEHICLE LIFTGATE WINDOW ASSEMBLY WITH HEATER GRID

(71) Applicant: MAGNA MIRRORS OF AMERICA, INC., Holland, MI (US)

(72) Inventors: Darin J. Snider, Holland, MI (US); David L. Guillozet, Hamilton, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 489 days.

(21) Appl. No.: 15/702,802

(22) Filed: Sep. 13, 2017

(65) Prior Publication Data

US 2018/0079379 A1 Mar. 22, 2018

Related U.S. Application Data

(60) Provisional application No. 62/395,582, filed on Sep. 16, 2016.

(51) Int. Cl.
| | |
|---|---|
| *H05B 3/86* | (2006.01) |
| *H05B 3/84* | (2006.01) |
| *H05B 3/10* | (2006.01) |
| *B60R 16/03* | (2006.01) |
| *H05B 3/03* | (2006.01) |
| *B60J 1/18* | (2006.01) |
| *B60J 10/70* | (2016.01) |
| *B60S 1/02* | (2006.01) |
| *B60J 1/20* | (2006.01) |

(52) U.S. Cl.
CPC ............. *B60R 16/03* (2013.01); *B60J 1/1884* (2013.01); *B60J 1/2094* (2013.01); *B60J 10/70* (2016.02); *B60S 1/026* (2013.01); *H05B 3/03* (2013.01); *H05B 3/84* (2013.01); *B60Y 2410/115* (2013.01); *H05B 2203/011* (2013.01); *H05B 2203/016* (2013.01)

(58) Field of Classification Search
CPC ............ H05B 3/84–86; H05B 3/10–14; H05B 3/20–34; H05B 2203/031
See application file for complete search history.

(56) References Cited

U.S. PATENT DOCUMENTS

| | | | |
|---|---|---|---|
| 5,070,230 A * | 12/1991 | Osada | B32B 17/10036 219/203 |
| 5,551,197 A | 9/1996 | Repp et al. | |
| 5,830,529 A * | 11/1998 | Ross | B41M 3/12 427/152 |

(Continued)

*Primary Examiner* — Michael A Laflame, Jr.
(74) *Attorney, Agent, or Firm* — Honigman LLP

(57) ABSTRACT

A rear liftgate window assembly for a vehicle includes a glass window panel configured to be pivotally mounted at a rear portion of a vehicle so as to be pivotable between a closed position and an opened position. A heater grid includes a plurality of electrically conductive traces established at the inner surface of the glass window panel. A pair of busbars are established at the inner surface of the glass window panel and extend outboard of at least one side region of the inner surface of the window panel that contacts a seal at the vehicle when the glass window panel is in the closed position. Electrical connectors are electrically connected to the busbars outboard of the side region. The electrical connectors are configured to electrically connect to a power source of the vehicle when the rear liftgate window assembly is mounted at the vehicle.

20 Claims, 5 Drawing Sheets

(56) References Cited

U.S. PATENT DOCUMENTS

| | | | |
|---|---|---|---|
| 5,853,895 A | 12/1998 | Lewno | |
| 7,105,220 B2* | 9/2006 | Freeman | B32B 17/10036 |
| | | | 428/172 |
| 7,184,190 B2 | 2/2007 | McCabe et al. | |
| 7,255,451 B2 | 8/2007 | McCabe et al. | |
| 7,274,501 B2 | 9/2007 | McCabe et al. | |
| 8,402,695 B2 | 3/2013 | Smith et al. | |
| 8,881,458 B2 | 11/2014 | Snider et al. | |
| 9,579,955 B2 | 2/2017 | Snider | |
| 2004/0124659 A1* | 7/2004 | Vaitus | B60J 5/101 |
| | | | 296/106 |
| 2004/0245801 A1* | 12/2004 | Gates | B60J 1/1884 |
| | | | 296/146.8 |
| 2005/0194805 A1* | 9/2005 | Gates | B60Q 1/56 |
| | | | 296/1.07 |
| 2007/0029301 A1* | 2/2007 | Tokiwa | H05B 3/84 |
| | | | 219/219 |
| 2007/0046060 A1* | 3/2007 | Werner | B60J 1/1884 |
| | | | 296/51 |
| 2010/0193242 A1* | 8/2010 | Derda | H01R 12/62 |
| | | | 174/88 R |
| 2011/0233182 A1* | 9/2011 | Baranski | H05B 3/86 |
| | | | 219/203 |
| 2011/0297661 A1* | 12/2011 | Raghavan | H05B 3/84 |
| | | | 219/203 |
| 2013/0174488 A1* | 7/2013 | Snider | B60J 1/1853 |
| | | | 49/70 |
| 2015/0244089 A1* | 8/2015 | Reul | B32B 17/10036 |
| | | | 439/78 |
| 2016/0200241 A1 | 7/2016 | Snider | |
| 2017/0019955 A1* | 1/2017 | Schulz | B32B 17/10036 |
| 2017/0118803 A1* | 4/2017 | Dimitrijevic | H05B 3/84 |
| 2017/0231034 A1* | 8/2017 | MacLachlan | H05B 3/84 |
| 2017/0246984 A1 | 8/2017 | Snider | |
| 2018/0227986 A1 | 8/2018 | Snider et al. | |
| 2018/0310366 A1* | 10/2018 | Nelson | B41M 1/12 |

* cited by examiner

VEHICLE LIFTGATE WINDOW ASSEMBLY WITH HEATER GRID

CROSS REFERENCE TO RELATED APPLICATION

The present application claims the filing benefits of U.S. provisional application Ser. No. 62/395,582, filed Sep. 16, 2016, which is hereby incorporated herein by reference in its entirety.

FIELD OF THE INVENTION

The present invention relates to a rear window assembly for a vehicle and, more particularly, a rear liftgate window assembly for a SUV or crossover vehicle or station wagon or the like.

BACKGROUND OF THE INVENTION

It is known to provide a rear liftgate window assembly for a rear opening of a vehicle. Such liftgate window assemblies are pivotable between a closed state and an opened state. The glass window panel of the liftgate often has a heater grid established thereat, with electrical wire connections made to the heater grid at the window panel (see FIG. 1). In order to avoid rubbing of the seal against the heater grid, the wiring and busbars of the heater grid are inboard or inside the region of the window where the seal of the vehicle will contact the window panel when the liftgate is closed, which results in the connectors and wiring being visible to a person viewing the window from inside the vehicle when the liftgate is closed.

SUMMARY OF THE INVENTION

The present invention provides a rear liftgate window assembly that includes a heater grid with the electrical connections established outboard of where a seal of the vehicle will contact the window panel when the liftgate is closed. Thus, the electrical connectors and wiring are disposed outboard of the vehicle seal (such as at a black-out area or ceramic frit area of the window panel) and thus are hidden from view by the interior vehicle trim panels when the liftgate is closed. A busbar tab is disposed at the window panel outboard of the heater grid busbar and spans the area or region where the vehicle seal contacts the window panel when the liftgate is closed (which is the area or region between the heater grid busbar and the electrical connector or contact at the window panel). A protective strip or tape may be applied at the busbar tab so that the seal does not contact and rub against the busbar tab when the liftgate is closed.

These and other objects, advantages, purposes and features of the present invention will become apparent upon review of the following specification in conjunction with the drawings.

DESCRIPTION OF THE PREFERRED EMBODIMENTS

Figure 1:
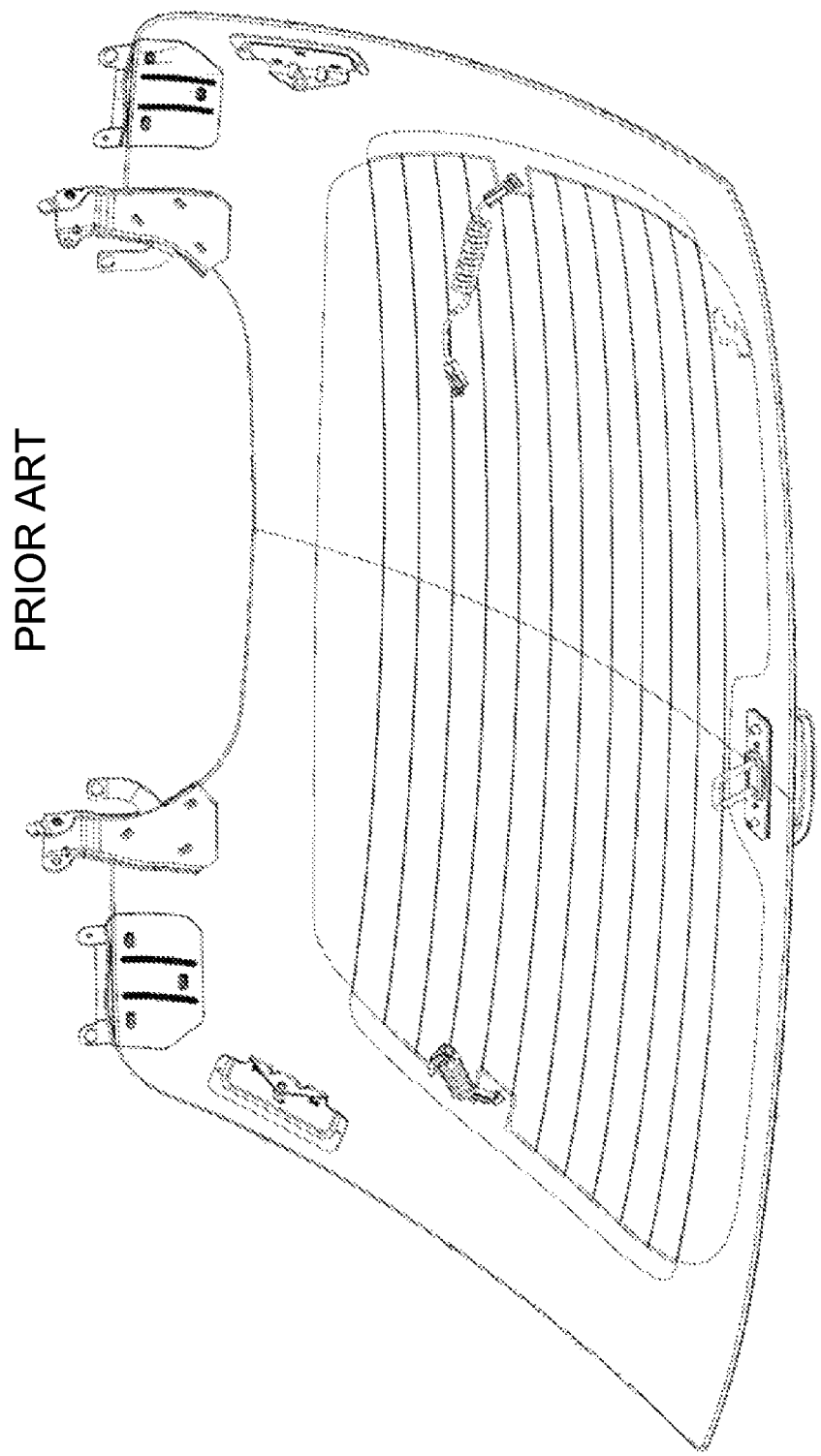
FIG. 1 is a rear perspective view of a rear liftgate window assembly having known electrical connections for a heater grid.
Figure 2:
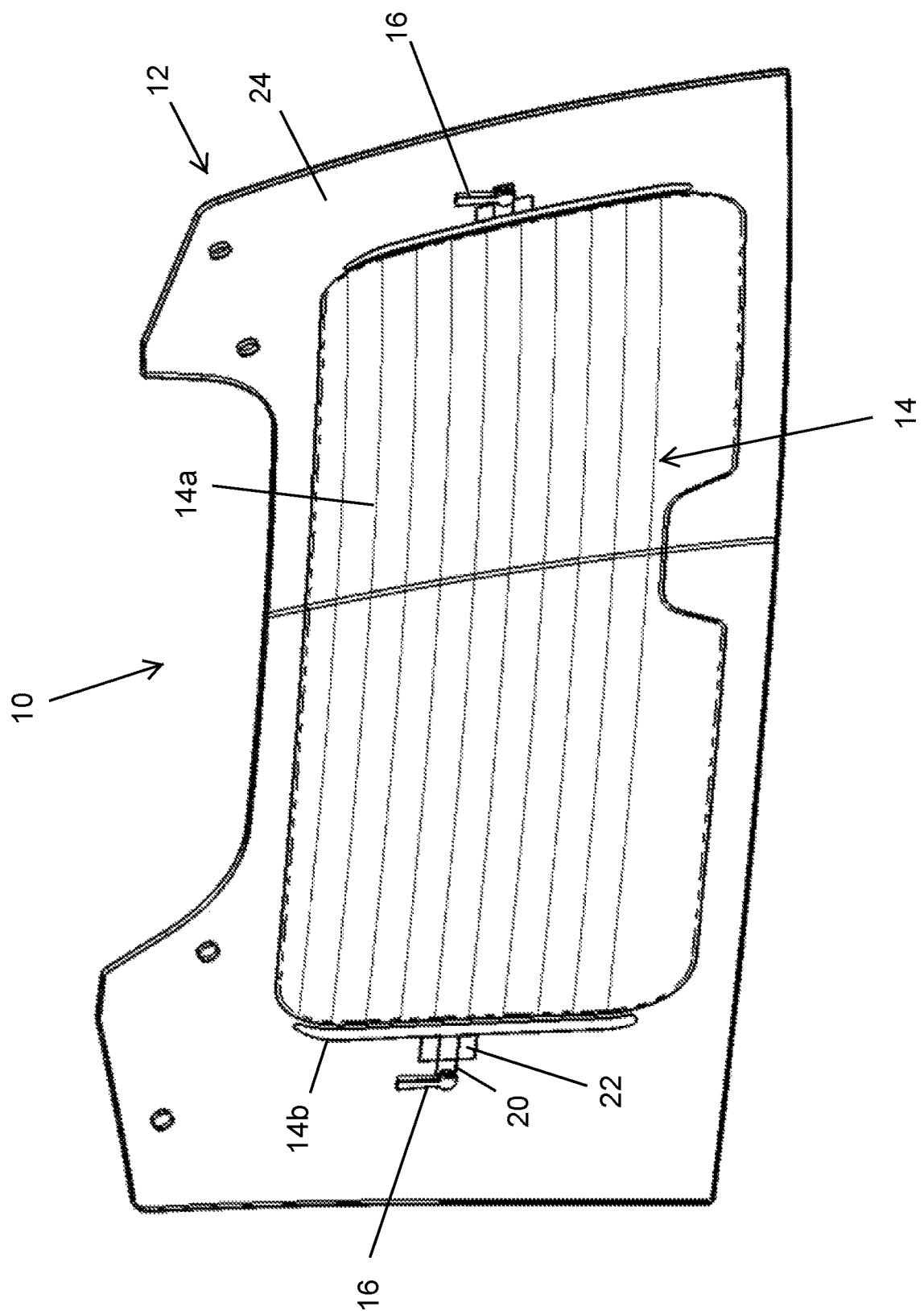
FIG. 2 is an interior elevation of a liftgate window assembly of the present invention, having electrical connection to the heater grid outboard of a sealing region.
Figure 3:
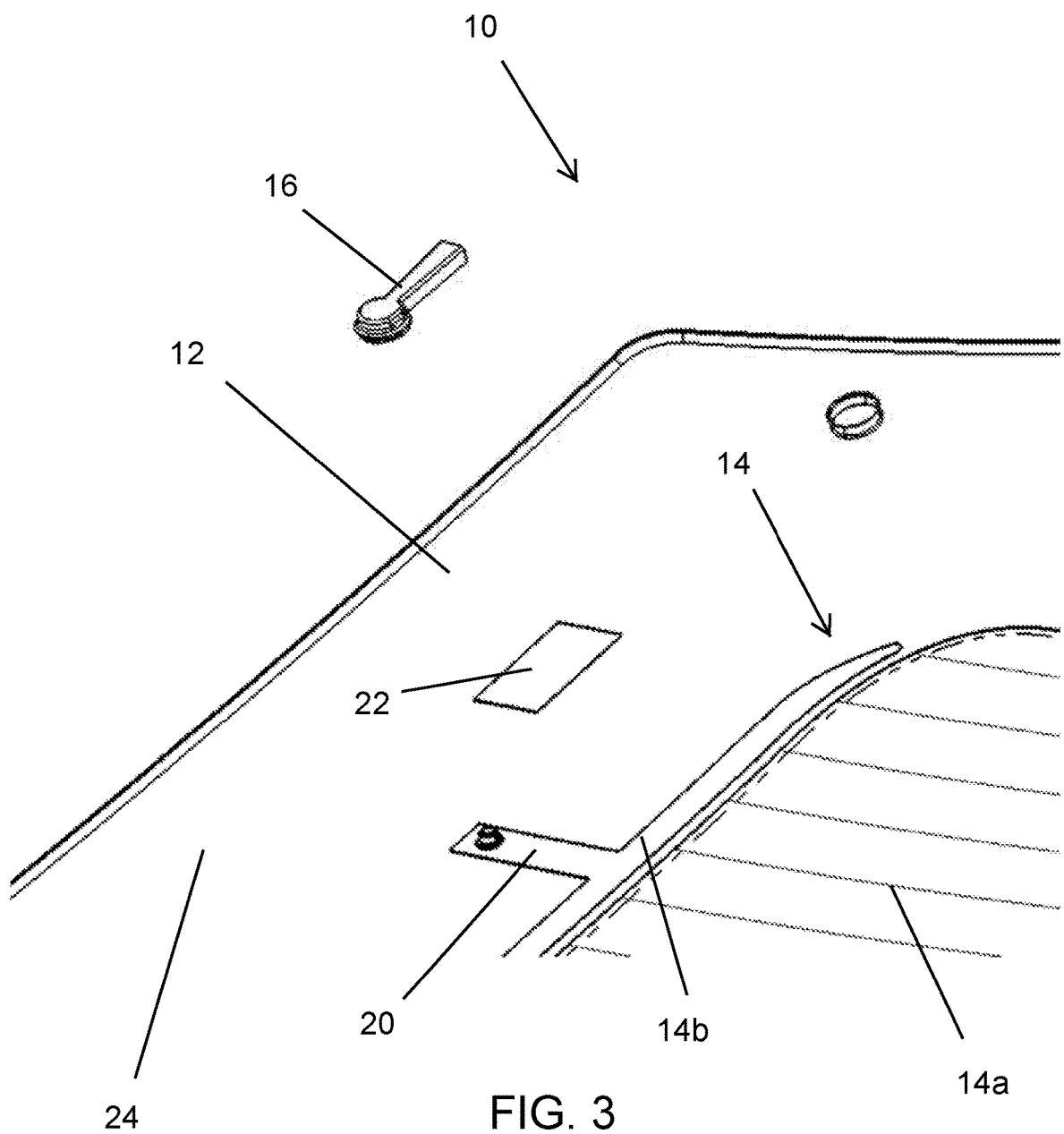
FIG. 3 is an exploded perspective view of the electrical connection of FIG. 2, showing an outboard electrical busbar with a protective tape at the busbar to limit the busbar from contacting the seal when the liftgate is closed.

Referring now to the drawings and the illustrative embodiments depicted therein, a rear liftgate window assembly 10 for a vehicle (such as a SUV or the like) is pivotally mounted at the vehicle and is pivotable between an opened position, where the window panel is pivoted or lifted upward to open a rear portion of the vehicle, and a closed position, where the window panel is pivoted or lowered to close the rear portion of the vehicle. The rear liftgate window assembly 10 includes a window panel 12 (which may cooperate with a fixed or movable lower rear panel or door or liftgate of the vehicle to close the rear portion of the vehicle). The window assembly 10 includes a heater grid 14 disposed at the interior surface of the glass window panel 12. The heater grid 14 comprises conductive traces 14a and busbars 14b that are electrically powered via an electrical connector 16 at opposite side regions of the window panel 12, with the electrical connectors 16 being laterally outboard of where a seal 18 (FIG. 4) of the vehicle contacts the inner surface of the window panel 12 when the liftgate is closed, as discussed below.

In the illustrated embodiment, the heater grid 14 comprises a plurality of electrically conductive horizontal traces 14a disposed at the glass window panel between vertical busbars 14b. The electrical terminals or connectors 16 are disposed at or attached at busbars or busbar tabs 20, which are disposed at the window panel outboard from vertical busbars 14b. Electrical power is provided to the heater grid traces (and associated busbars) when the connectors 16 are electrically connected to vehicle wiring and powered. The electrically conductive heater grid or heating element thus is established at the window panel (such as at or on an interior surface of the window panel) and is electrically conductively connected to (or is otherwise in electrical conductive continuity with) a power source of the vehicle and may be powered (such as responsive to a user actuatable input or switch or button of the vehicle or responsive to a sensor or accessory of the vehicle) to heat or defrost or defog the window panel. In the illustrated embodiment, the plurality of electrically conductive traces extend across the window panel between the vertical busbars to provide enhanced and more uniform heating and defrosting/defogging of the window panel.

Figure 4:
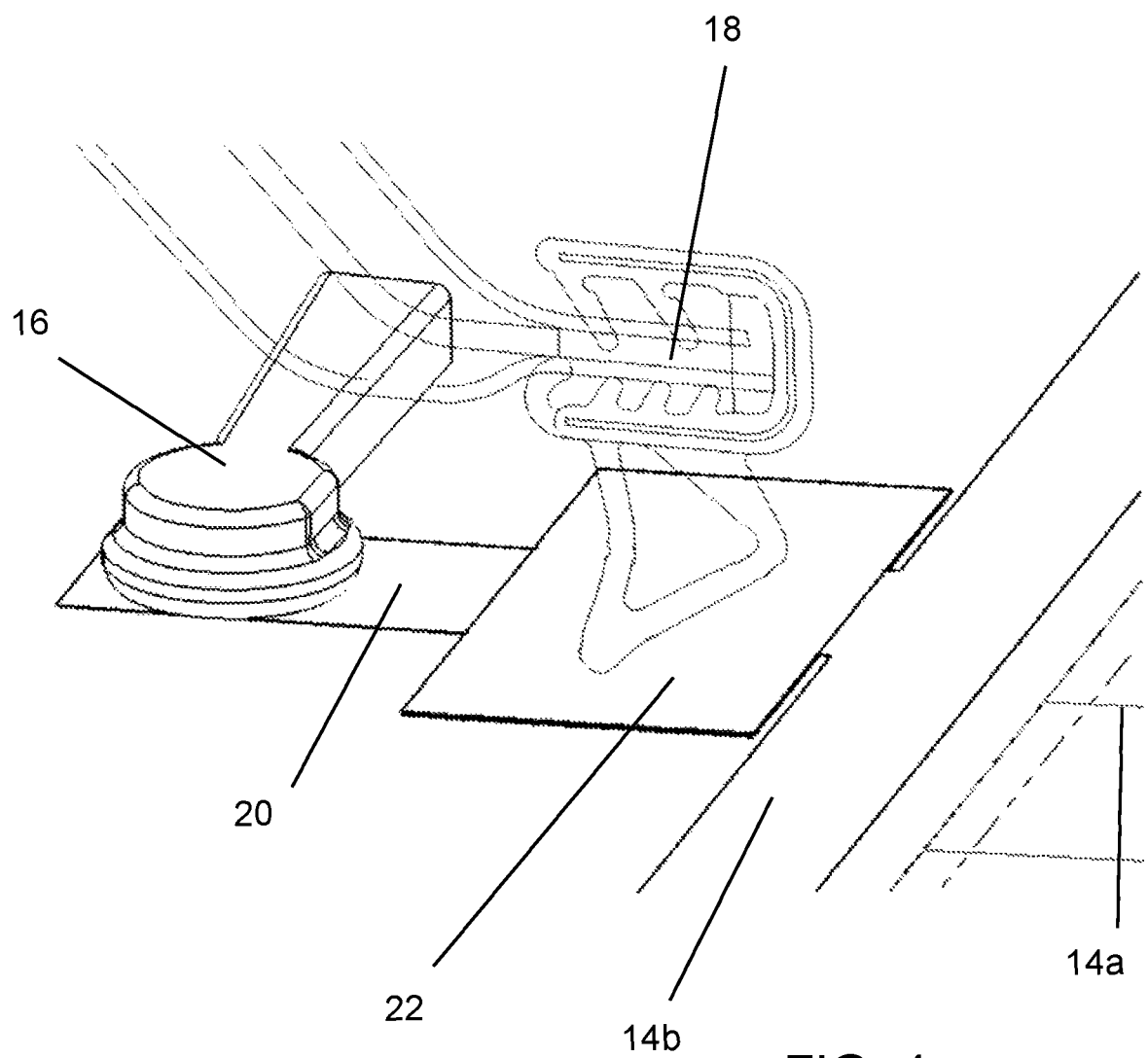
FIG. 4 is an enlarged perspective view of the electrical connection of FIG. 2, showing the seal contacting the protective tape at the busbar.

The seal 18 is disposed at the vehicle rear opening and circumscribes the vehicle opening. As shown in FIG. 4, when the liftgate is closed, the seal 18 contacts the inner surface of the window panel 14 to seal against the inner surface to limit air and water intrusion when the liftgate is closed. The seal contacts the inner surface of the closed window panel along upper and lower regions above and below the heater grid and busbars and side regions outboard of the heater grid 14. The upper, lower and side regions of the window panel where the seal contacts the window panel are preferably regions of the window panel that include a dark or opaque or non-light-transmitting coating or frit layer 24 that circumscribes a transparent (or tinted) portion of the window panel through which the driver of the vehicle can view to see rearward of the vehicle. The busbars or busbar tabs 20 are in electrical conductive continuity with the busbars 14b of the heater grid 14 and extend outboard from the respective busbar 14b and span the region where the seal contacts the window panel, whereby the electrical connector 16 is disposed at or near an outboard end of each busbar 20 (outboard of the seal region). As can be seen with reference to FIG. 4, the seal 18 contacts the inner surface of the closed window panel at the busbar 20 and outboard of the heater grid busbar 14b and inboard of the connector 16.

Optionally, and desirably, a protective element or tape or strip or patch 22 may be provided at the busbars 20. The protective tape 22 is disposed over the busbars at the inner surface of the window panel at the region where the seal 18 contacts the inner surface of the window panel when the liftgate is closed. The electrical connectors 16 and busbars 20 and protective tape 22 are preferably disposed at a region of the window pane where the dark or opaque or non-light-transmitting coating or frit layer 24 is disposed, such that the electrical connectors and protective tape are not viewable to a person viewing the rear window panel from exterior of the vehicle when the window panel is closed. The protective tape 22 may comprise an adhesive tape or strip that may be adhered at the inner surface of window panel over the frit layer 24 and busbar tab 20.

Figure 5:
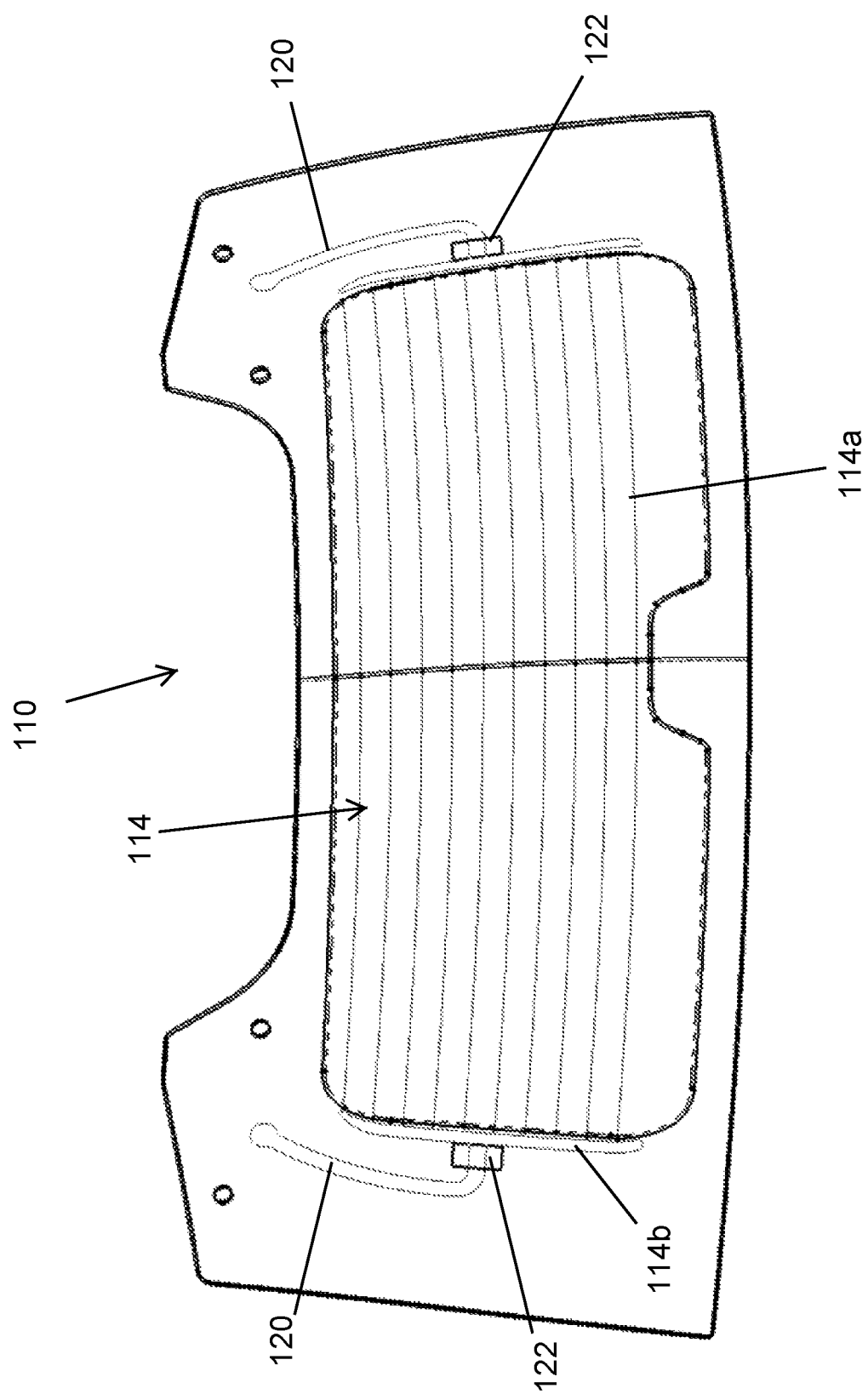
FIG. 5 is an interior elevation of another liftgate window assembly of the present invention, shown with busbars extending upward from the outboard region for electrical connection to wiring or circuitry of the vehicle at an upper region of the liftgate window assembly.

Optionally, and with reference to FIG. 5, a liftgate window assembly 110 includes a heater grid 114 having heater traces 114a and vertical busbars 114b, with busbars or busbar tabs 120 disposed at the inner surface of the window panel 112 and extending outboard of the busbars 114b and spanning the region of the window panel that contacts the seal (when the window is closed) and extending upward along the window panel, such that electrical connection to the busbars 120 may be made at an upper region of the window panel, such that the electrical wiring of the vehicle (that electrically connects to the busbars 120) is not visible or is at least partially hidden from view when the liftgate is opened or closed. The liftgate window assembly 110 includes protective tape or strips 122 (that may be adhered or otherwise attached at the inner surface of the window panel) at the busbars 120 at the region of the busbars that would otherwise contact the vehicle seal when the liftgate is closed. The liftgate window assembly 110 may otherwise be similar to the liftgate window assembly 10, discussed above, such that a detailed discussion of the assemblies need not be repeated herein.

The electrical connection to the busbars 20, 120 may comprise any suitable electrical connection, such as a tab or snap that is attached or soldered at the busbars (where a wire connector may receive the connection or press-fit or snap or otherwise attach to the connection). Clearly, other means for electrically connecting the electrical connectors to a wiring harness or circuitry of the vehicle may be implemented while remaining within the spirit and scope of the present invention. For example, the heater grid and conductive traces and electrical connections may utilize aspects of the systems described in U.S. Pat. Nos. 8,881,458; 8,402,695; 7,274,501; 7,184,190 and/or 7,255,451, which are hereby incorporated herein by reference in their entireties.

In the illustrated embodiment, the liftgate window assembly comprises a separately openable window panel assembly, where the liftgate window may be opened separately from the lower rear panel or door of the vehicle. Optionally, the liftgate window assembly may open and close with the rear panel or door, while remaining within the spirit and scope of the present invention.

The liftgate may include hinge supports, strut supports (that may hold or attach an end of a gas-assist spring or strut at the window panel) and a latch element, which may be bonded to the inner surface of the glass window panel (such as at regions where the opaque frit layer is disposed), such that the liftgate window assembly does not require any frame portions or trim elements or the like. The hinge supports and/or strut supports and/or latch elements may be adhesively bonded at the glass window panel by utilizing aspects of the systems described in U.S. Pat. Nos. 5,853,895 and/or 5,551,197, which are hereby incorporated herein by reference in their entireties.

Therefore, the rear liftgate window assembly of the present invention provides a heater grid at the glass window panel that is electrically connected to one or more electrical connectors of the vehicle at a location outboard of where the seal of the vehicle will contact the inner surface of the window panel when the liftgate is closed. A protective element or strip or tape may be disposed at the busbars that span between the connectors and the heater grid to electrically connect the heater grid to the electrical connectors, with the tape being disposed at the location where the vehicle seal would otherwise contact the busbars when the liftgate is closed.

Changes and modifications to the specifically described embodiments may be carried out without departing from the principles of the present invention, which is intended to be limited only by the scope of the appended claims, as interpreted according to the principles of patent law.

The invention claimed is:

1. A rear liftgate window assembly for a vehicle, said rear liftgate window assembly comprising:

a glass window panel configured to be pivotally mounted at a rear portion of a vehicle so as to be pivotable between a closed position, where said glass window panel is disposed at a rear opening of the vehicle and against a seal that circumscribes the rear opening of the vehicle, and an opened position, where said glass window panel is raised to a generally horizontal orientation;

wherein, with said glass window panel pivotally mounted at the rear portion of the vehicle and when said glass window panel is in the closed position, the seal contacts at least one perimeter region of an inner surface of said glass window panel;

a heater grid disposed at said inner surface of said glass window panel, said heater grid comprising a plurality of electrically conductive traces established at said inner surface of said glass window panel inboard of said at least one perimeter region, wherein said plurality of electrically conductive traces terminate at busbars disposed inboard of said at least one perimeter region;

a pair of busbar connecting portions established at said inner surface of said glass window panel, wherein said busbar connecting portions extend from the respective busbars, across said at least one perimeter region of said inner surface of said glass window panel that contacts the seal at the vehicle when said glass window panel is pivotally mounted at the vehicle and when said glass window panel is in the closed position, to respective locations at said inner surface that are outboard of said at least one perimeter region of said inner surface of said glass window panel;

electrical connectors electrically connected to said busbar connecting portions at the respective locations outboard of said at least one perimeter region; and wherein said electrical connectors are configured to electrically connect to a power source of the vehicle when said glass window panel is pivotally mounted at the vehicle.

2. The rear liftgate window assembly of claim 1, comprising a protective covering element disposed at each of said busbar connecting portions to limit or preclude the seal contacting said busbar connecting portions when said glass window panel is pivotally mounted at the vehicle and when said glass window panel is in the closed position.

3. The rear liftgate window assembly of claim 2, wherein said protective covering element comprises protective tape adhered to said inner surface of said glass window panel and over a portion of each of said busbar connecting portions.

4. The rear liftgate window assembly of claim 1, wherein said busbar connecting portions comprise (i) a first busbar connecting portion established at said inner surface of said glass window panel at and outboard of a first perimeter region of said inner surface of said glass window panel that contacts the seal at the vehicle when said glass window panel is pivotally mounted at the vehicle and when said glass window panel is in the closed position, and (ii) a second busbar connecting portion established at said inner surface of said glass window panel at and outboard of a second perimeter region of said inner surface of said glass window panel that contacts the seal at the vehicle when said glass window panel is pivotally mounted at the vehicle and when said glass window panel is in the closed position.

5. The rear liftgate window assembly of claim 4, wherein said first perimeter region is opposite said second perimeter region and wherein said busbars and said plurality of electrically conductive traces of said heater grid are established between said first perimeter region and said second perimeter region.

6. The rear liftgate window assembly of claim 4, wherein said electrical connectors comprise a positive connector at said first perimeter region of said inner surface of said glass window panel and a negative connector at said second perimeter region of said inner surface of said glass window panel.

7. The rear liftgate window assembly of claim 4, wherein said first busbar connecting portion is established outboard of said first perimeter region and extends upward toward an upper region of said inner surface of said glass window panel, and wherein said second busbar connecting portion is established outboard of said second perimeter region and extends upward toward said upper region of said inner surface of said glass window panel, and wherein said electrical connectors are electrically connected to said first and second busbar connecting portions at said upper region of said inner surface of said glass window panel.

8. The rear liftgate window assembly of claim 1, wherein said busbar connecting portions are established at said inner surface of said glass window panel and extend upward toward an upper region of said inner surface of said glass window panel, and wherein said electrical connectors are electrically connected to said busbar connecting portions at said upper region of said inner surface of said glass window panel.

9. The rear liftgate window assembly of claim 1, wherein said electrical connectors are soldered to a connector portion of said busbar connecting portions.

10. The rear liftgate window assembly of claim 1, wherein said electrical connectors comprise tab-type connectors or snap-type connectors.

11. The rear liftgate window assembly of claim 1, wherein said busbar connecting portions are established at a region of said glass window panel that has a non-light-transmitting coating established thereat.

12. The rear liftgate window assembly of claim 11, wherein said non-light-transmitting coating circumscribes a transparent region of said glass window panel, and wherein said plurality of electrically conductive traces of said heater grid are established at said inner surface of said glass window panel at said transparent region.

13. A rear liftgate window assembly for a vehicle, said rear liftgate window assembly comprising:
  a glass window panel configured to be pivotally mounted at a rear portion of a vehicle so as to be pivotable between a closed position, where said glass window panel is disposed at a rear opening of the vehicle and against a seal that circumscribes the rear opening of the vehicle, and an opened position, where said glass window panel is raised to a generally horizontal orientation;
  wherein, with said glass window panel pivotally mounted at the rear portion of the vehicle and when said glass window panel is in the closed position, the seal contacts a first side region of an inner surface of said glass window panel and a second side region of said inner surface of said glass window panel;
  a heater grid disposed at said inner surface of said glass window panel, said heater grid comprising a plurality of electrically conductive traces established at said inner surface of said glass window panel;
  said heater grid further comprising a first busbar established at said inner surface of said glass window panel at a first end of said electrically conductive traces of said heater grid;
  a first busbar connecting portion established at said inner surface of said glass window panel outboard of said first side region of said inner surface of said glass window panel that contacts the seal at the vehicle when said glass window panel is pivotally mounted at the vehicle and when said glass window panel is in the closed position, wherein a portion of said first busbar connecting portion spans said first side region so as to electrically conductively connect said first busbar connecting portion to said first busbar of said heater grid;
  said heater grid further comprising a second busbar established at said inner surface of said glass window panel at a second end of said electrically conductive traces of said heater grid;
  a second busbar connecting portion established at said inner surface of said glass window panel outboard of said second side region of said inner surface of said glass window panel that contacts the seal at the vehicle when said glass window panel is pivotally mounted at the vehicle and when said glass window panel is in the closed position, wherein a portion of said second busbar connecting portion spans said second side region so as to electrically conductively connect said second busbar connecting portion to said second busbar of said heater grid;
  a first protective covering element disposed at said portion of said first busbar connecting portion to limit or preclude the seal contacting said portion of said first busbar connecting portion when said glass window panel is pivotally mounted at the vehicle and when said glass window panel is in the closed position;
a second protective covering element disposed at said portion of said second busbar connecting portion to limit or preclude the seal contacting said portion of said second busbar connecting portion when said glass window panel is pivotally mounted at the vehicle and when said glass window panel is in the closed position;
a positive connector electrically conductively connected to said first busbar connecting portion outboard said first side region of said inner surface of said glass window panel;
a negative connector electrically conductively connected to said second busbar connecting portion outboard said second side region of said inner surface of said glass window panel; and
wherein said positive and negative electrical connectors are configured to electrically connect to a respective wire of the vehicle when said glass window panel is pivotally mounted at the vehicle.

14. The rear liftgate window assembly of claim 13, wherein said first and second protective covering elements comprise protective tape adhered to said inner surface of said glass window panel and over said portion of the respective busbar connecting portion.

15. The rear liftgate window assembly of claim 13, wherein said first side region is opposite said second side region and said first and second busbars and said electrically conductive traces of said heater grid are established between said first side region and said second side region.

16. The rear liftgate window assembly of claim 13, wherein said first busbar connecting portion is established outboard of said first side region and extends upward toward an upper region of said inner surface of said glass window panel, and wherein said second busbar connecting portion is established outboard of said second side region and extends upward toward said upper region of said inner surface of said glass window panel, and wherein said positive electrical connector is electrically connected to said first busbar connecting portion at said upper region of said inner surface of said glass window panel, and wherein said negative electrical connector is electrically connected to said second busbar connecting portion at said upper region of said inner surface of said glass window panel.

17. The rear liftgate window assembly of claim 13, wherein said positive and negative electrical connectors are soldered to a connector portion of the respective busbar connecting portion.

18. The rear liftgate window assembly of claim 13, wherein said positive and negative electrical connectors comprise tab-type connectors or snap-type connectors.

19. The rear liftgate window assembly of claim 13, wherein said first and second busbar connecting portions are established at a region of said glass window panel that has a non-light-transmitting coating established thereat.

20. The rear liftgate window assembly of claim 19, wherein said non-light-transmitting coating circumscribes a transparent region of said glass window panel, and wherein said electrically conductive traces of said heater grid are established at said inner surface of said glass window panel at said transparent region.

* * * * *